United States Patent [19]

Stanek

[11] Patent Number: 4,860,866
[45] Date of Patent: Aug. 29, 1989

[54] VEHICLE SEAT ADJUSTER CLUTCH

[75] Inventor: Carl E. Stanek, Hamtramck, Mich.

[73] Assignee: General Motors Corporation, Detroit, Mich.

[21] Appl. No.: 209,159

[22] Filed: Jun. 20, 1988

[51] Int. Cl.⁴ .............................................. F16D 11/06
[52] U.S. Cl. ..................................... 192/71; 192/84 T
[58] Field of Search ..................... 192/71, 84 T, 93 C; 297/330

[56] References Cited

U.S. PATENT DOCUMENTS

| | | | |
|---|---|---|---|
| 2,735,528 | 2/1956 | Dodge | 192/93 C |
| 3,721,324 | 3/1973 | Schweizer | 192/71 |
| 3,754,626 | 8/1973 | Heidorn | 192/93 C |
| 4,379,502 | 4/1983 | Ball et al. | 192/93 C |
| 4,460,078 | 7/1984 | Heide et al. | 192/71 |
| 4,550,817 | 11/1985 | Euler | 192/93 C |

*Primary Examiner*—Peter R. Brown
*Assistant Examiner*—Brian K. Green
*Attorney, Agent, or Firm*—Patrick M. Griffin

[57] ABSTRACT

A clutch for a vehicle seat adjuster or the like includes a central shaft that extends coaxially through a sleeve type solenoid plunger, with a drive gear nested within a cup shaped pawl on the end of the shaft. A short rod is slidably contained in the shaft normal to the shaft axis, and surrounded by a pair of steel balls held in a cylindrical wall of the drive gear, which are in turn surrounded by the stepped inner diameter of a cylindrical wall of the pawl. When the solenoid shifts the pawl back and forth, the balls are shifted toward or away from the rod, so as to make or break a positive driving connection therewith.

3 Claims, 1 Drawing Sheet

VEHICLE SEAT ADJUSTER CLUTCH

This invention relates to clutches in general, and especially to a clutch that selectively engages and disengages a vehicle seat adjuster mechanism or the like.

BACKGROUND OF THE INVENTION

Vehicle seat adjusters of the powered type typically have a separate motor for each of the directions, usually three, in which they adjust the seat. The clutch that selectively connects and disconnects the motor to the adjuster mechanism is generally what is referred to as a dog clutch. This consists of two facing serrated plates that are moved together or apart, often by a solenoid, engage or disengage the teeth. When together, the interengaged teeth transfer torque, and when apart, the plates rotate freely. An obvious drawback of such a system is the need for a motor and clutch for each of the three directions, with the associated expense, weight, and occupied space beneath the seat. Another problem with this type of clutch is that, when the plates are first pushed toward one another, the teeth may be at such an angular relation that they hit at their high points. There is nothing to assure that the high points of one set of teeth will be aligned with the valleys of the other set of teeth at any given time. An automatically self aligning clutch would be a desirable improvement, even more so if it offered the opportunity for a more compact system using fewer motors.

SUMMARY OF THE INVENTION

The invention provides such a self aligning clutch, one which is also well adapted for multiple use with a single motor so as to save space and weight. In the preferred embodiment, a solenoid is rigidly mounted to the vehicle, generally beneath the seat. Running through the center of the solenoid is a sleeve type plunger, and running through the plunger is a cylindrical shaft, a free portion of which extends out. Each end of the shaft is joined to the cable of a vehicle seat adjuster mechanism, and is held in position thereby. Intermediate the free portion of the shaft is a through passage, perpendicular to the shaft axis. A short rod with rounded ends is slidably contained within the shaft passage. The rod is longer than the passage, so that, when centered relative to the shaft, it extends out at each end beyond the outer surface of the shaft.

A cylindrical drive gear is piloted coaxially on the far end of the free portion of the shaft, and is powered by a belt or chain from a suitable motor. Extending inwardly toward the solenoid from the drive gear is a cylindrical wall, which surrounds and is spaced from the ends of the short rod. Contained in radial holes in the drive gear cylindrical wall are a pair of balls. The balls are angularly offset from a direct, diametrical opposition by an amount that corresponds to the width of the short rod. That is, if one end of the rod is aligned with one of the balls, the other ball is located against the side of the other end of the rod. While the balls can move radially in or out, they are confined as to how far they can move either way. The radial inward movement of the balls is limited by the central shaft. Controlling and limiting the radial outward movement of the balls is a cup shaped pawl, which is also piloted slidably on the shaft, between the drive gear and the end of the plunger. The pawl has a cylindrical wall with a stepped inner diameter that surrounds the drive gear wall and the balls. Depending on which diameter surrounds the balls, they may either move radially outward, or be confined closer to the shaft. Which diameter of the pawl surrounds the balls, in turn depends on the location of the pawl, and the location of the pawl is determined by the plunger, which is moved by turning the solenoid on or off.

In the disengaged position, with the solenoid off, the greater diameter of the pawl surrounds the balls, which are consequently allowed to move farther apart than the length of the short rod. So, as the drive gear spins on the shaft, the balls, when contacted by the rounded ends of the rod, will be kicked outwardly, and the short rod will self center at an equilibrium position within the passage in the central shaft. The balls will not make a positive or driving engagement with the short rod. In the engaged position, with the solenoid on, the pawl is pushed by the plunger toward the drive gear, and the smaller diameter of the pawl moves over the balls, confining them more tightly. The balls are now spaced apart less than the length of the short rod. Consequently, one rod end will hit one ball, shifting the other end of the rod out. Because of the relative angular position of the balls, the side of the other end of the rod will be brought into engagement with the other ball, and a positive driving connection will be made between the drive gear and the shaft, turning the cable. No matter what the relative position of the ends of the rod and the balls when the pawl is shifted, the balls and short rod automatically self align to the proper position to make a positive driving connection. In addition, because of the way the drive gear pilots on the central shaft, several such clutches could be clustered together in parallel fashion, with all of the drive gears being run by one chain or belt from a single motor or power source. Each solenoid would be selectively turned on or off as desired to power the different cables for the adjuster.

It is, therefore, a general object of the invention to provide an improved clutch for the seat adjuster of a vehicle or the like which is automatically self aligning.

It is another object of the invention to provide such a clutch in which the interaction of a pair of selectively radially confined balls and the ends of a short rod slidably contained in a dive shaft and surrounded by the balls provides for an automatic, self aligning and positive drive connection between a powered member and the shaft.

It is another object of the invention to provide such a clutch in which the piloting of a drive gear and other components on the centrally located shaft provides for a particularly compact system of multiple clutches run by a single motor.

DESCRIPTION OF THE PREFERRED EMBODIMENT

These and other objects and features of the invention will appear from the following written description, and from the drawings, in which.

Figure 1:
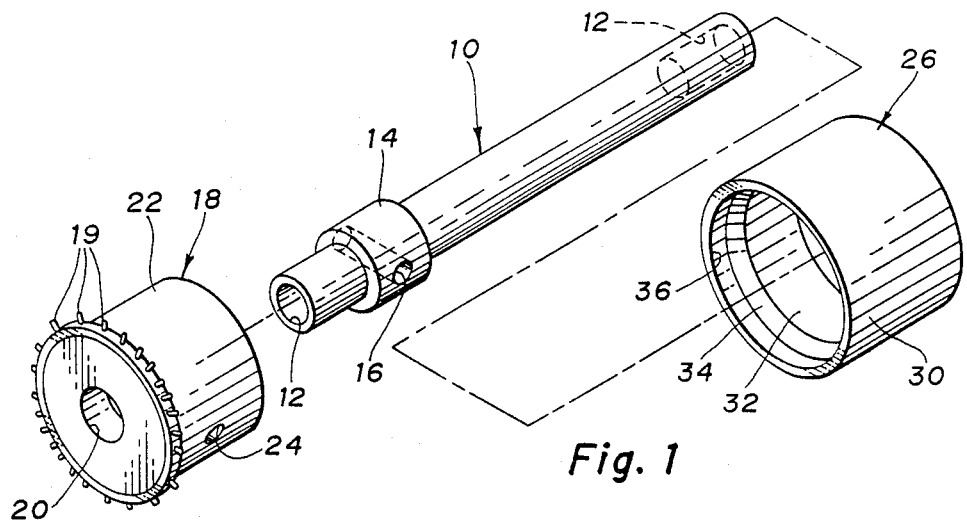
FIG. 1 is an exploded view of several components of the clutch of the invention disassembled.

Referring first to FIG. 1, several components of the invention are shown disassembled in order to illustrate better some structural details thereof. A central steel shaft designated generally at 10 has squared holes 12 at each end and an enlarged intermediate section 14. A passage 16 is bored through section 14 perpendicular to the centerline axis of shaft 10. A steel drive gear, designated generally at 18, has a set of teeth 19 on its outer surface. The inner surface of drive gear 18 includes a bearing journal 20, sized the same as the shaft 10, and a larger cylindrical wall 22. Cut through wall 22 are a pair of holes 24 only one of which is visible. Holes 24 are axially aligned, but are angularly offset by an amount defined below. A cup shaped steel pawl, designated generally at 26, also has a bearing journal 28 sized the same as journal 20, and a cylindrical wall 30. Wall 30 has a stepped inner diameter, the smaller diameter 32 of which is larger than the outer diameter of drive gear 18. The smaller diameter 30 merges across a sloped portion 34 into a still larger diameter 36.

Figure 2:
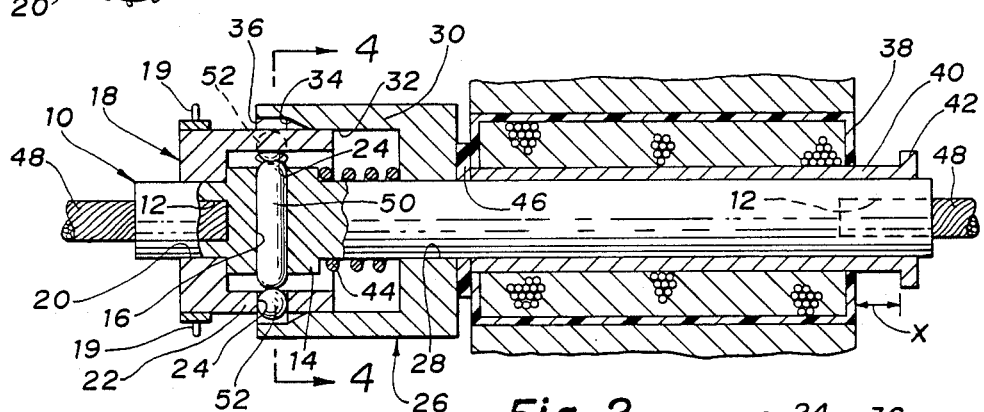
FIG. 2 is a cross sectional view of the preferred embodiment of the invention in the disengaged or off mode.

Referring next to FIG. 2, the rest of the components in their assembled relationship can be seen. The can of a solenoid 38 is rigidly fixed to the frame of a vehicle, generally beneath the seat, not illustrated. Running coaxially through the hollow center of solenoid 38 is a steel sleeve plunger 40, which has a stop flange 42 that extends out a distance x when solenoid 38 is off. Running through plunger 40 is shaft 10, a free portion of which extends out far enough to have both pawl 26 and drive gear 18 coaxially piloted thereon. The drive gear teeth 19 would be engaged by a chain or belt from an electric motor, not shown, which would fix and determine the axial position of drive gear 18. A return spring 44 biased between the shaft enlarged portion 14 and the inside of pawl 26 keeps it pressed against a plastic spacer 46 that insulates it from solenoid 38. Spring 44 maintains pawl 26 at what may be termed its disengaged position. Plugged into hole 12 in each end of shaft 10 is an end of the cable 48 of a typical vehicle seat adjuster mechanism, not illustrated. Cable 48 serves to maintain the basic axial position of shaft 10, while its radial position is determined by plunger 40 within the rigidly mounted solenoid 38. Drive gear wall 22 nests within pawl wall 30, their coaxial relation maintained by the fact that they both pilot on shaft 10. So shaft 10, besides serving as a torque transfer member, as will be described below, also serves as the basic foundation and axial alignment bearing for the various components of the clutch.

Figure 5:
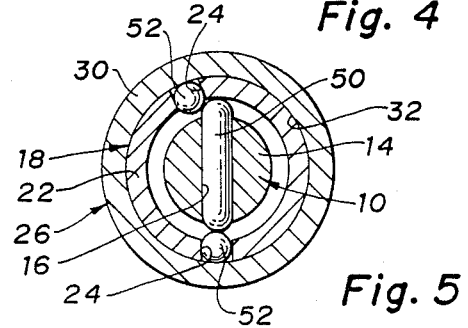
FIG. 5 is a view along the line 5—5 of FIG. 2.

Referring next to FIGS. 5 and 2, a short rod 50 is slidably contained in passage 16. Rod 50 is sufficiently long that, when centered relative to the centerline of shaft 10, its rounded ends extend out slightly beyond the outer surface of shaft portion 14, but short of the inside surface of wall 30. A steel ball 52 rests in each hole 24. The holes 24, and therefore the balls 52, are angularly offset from one another, that is, they are not directly diametrically opposed to one another. They are offset from a direct diametrical opposition by an amount that corresponds to the width of rod 50. In the particular case here, that is about 21 degrees. Stated differently, the holes 24 are angularly offset an amount such that, if one ball 52 were aligned with one end of rod 52, and if the other ball 52 were held against the outer surface of shaft portion 14, the other ball 52 would rest against the outer surface of the other end of rod 50. This orientation serves a purpose described below, and will obviously differ in degree for different width rods 50. While the holes 24 determine the axial and circumferential position of the balls 52, they do not confine or limit them radially. The possible inward radial movement of balls 52 is limited by the outer surface of shaft portion 14. As best seen in FIG. 2, their possible outward radial movement is limited by the surrounding wall 30 of pawl 26. More specifically, in the disengaged position shown with solenoid 38 off and pawl 26 retracted, the balls 52 are confined at a first position by the larger diameter 36 of wall 30. The end to end length of rod 50, plus the diameters of the two balls 52, is slightly less than the greater diameter 36. Thus, in the FIG. 2 position, if drive gear 18 is rotating, carrying balls 52 with it, they will be kicked outwardly as far as they can go by their contact with the rounded ends of rod 50, which will be far enough that they will miss rod 50. At the same time, the rod 50 will be pushed to an equilibrium, self centered position within the passage 16. There will be no positive connection between drive gear 18 and shaft 10, and no torque transfer to cable 48.

Figure 3:
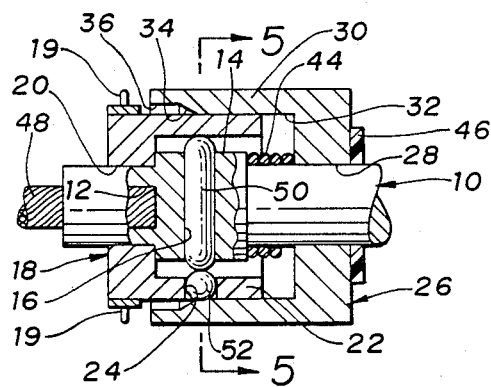
FIG. 3 is like FIG. 2, but showing the on, engaged mode.
Figure 4:
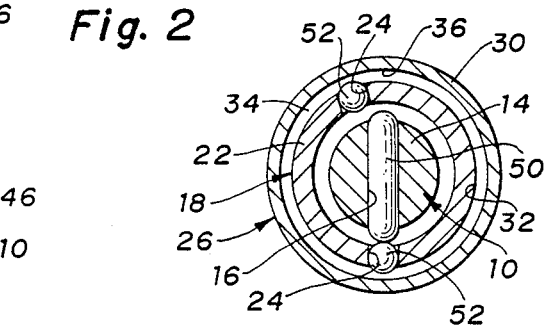
FIG. 4 is a view along the line 4—4 of FIG. 3.

Referring next to FIGS. 3 and 4, should the operator desire to adjust the seat by applying torque to cable 48, he would switch the solenoid 38 on, which would pull plunger 40 to the left the distance x until stop flange 42 hit, shifting pawl 26 to the left and compressing return spring 44. The distance x is sufficient to shift pawl 26 far enough that the wall sloped portion 34 moves over the balls 52, pushing them radially inwardly until the wall smaller diameter 32 surrounds them. The smaller diameter 32 is small enough to confine the balls 52 at a second position, against the outer surface of shaft portion 14, where they are spaced apart less than the length of rod 50. As the balls 52 are moved inwardly, one end of rod 50 will inevitably hit one of the balls 52. This initial rod end to ball contact will in turn shift the rod 50 from its centered position, bringing the other ball 52 into contact with the side of the other end of rod 50, as best seen in FIG. 5. This will establish a very secure, positive driving connection between drive gear 18 and shaft 10, transferring torque to cable 48 as shaft 10 spins within the plunger 40. The positive driving connection will automatically occur as rod 50 is shifted no matter what the relative location of the short rod 50 and the balls 52 when the solenoid is switched on, which may be considered a self aligning or self compensating action. When the operator turns solenoid 38 off, the return spring 44 shifts the pawl 26 back to the right, and the balls 52 and rod 50 automatically shift back to the equilibrium position, removing the positive connection.

Variations of the preferred embodiment disclosed could be made. The drive gear 18 could be replaced by some other member to provide power, such as a gear run directly by a motor. However, the particular embodiment shown, with the shaft 10 serving as the central backbone of the whole assembly, offers another great potential advantage. Several such clutches could be clustered in a parallel orientation, with each drive gear 18 being run like several sprockets from a single surrounding chain or belt, from a single motor. Any of several cables, corresponding to different directions of seat adjustment, could be selected by switching each particular solenoid on or off. This could provide significant cost, weight and space savings over the conventional system described above. Some means other than the pawl 26 could be used to selectively confine the balls 52 at the two different radial positions, although the cup shaped pawl 26 piloting on the central shaft 10 is particularly convenient and compact. Some means other than the solenoid 38 could be used to shift the pawl 26 back and forth, but the solenoid is particularly advantageous because its cylindrical, hollow shape lends itself well to the general coaxially aligned relationship of all the components, and because it can be easily rigidly mounted to the vehicle. Therefore, it will be understood that the invention is not intended to be limited to just the embodiment disclosed.

The embodiments of the invention in which an exclusive property or privilege is claimed are defined as follows:

1. A self aligning clutch for selectively transferring torque in a vehicle seat adjuster mechanism, comprising, a generally cylindrical shaft supported on said vehicle so as to spin about its axis, said shaft including a passage therethrough normal to said axis that slidably supports a rod therein with an end to end length greater than the length of said passage, a powered member having a cylindrical wall that is supported on said vehicle so as to be driven about its axis coaxial to said shaft and in surrounding relation to the ends of said rod, said cylindrical wall further having spaced holes on its circumference for supporting a pair of balls therein for radial movement in and out of said holes from a first position where said balls are spaced apart farther than the length of said rod to a second position where said balls are spaced apart less than the length of said rod, said balls also being supported in said wall with an angular offset corresponding to the width of said rod, and, control means selectively operable from an on mode that confines said balls in said second position to an off mode that allows said balls to move back to said first position, whereby, in said off mode, said balls will be moved out to their disengaged position by contact with the ends of said rod, which contact will self center said rod within its passage so that it does not positively engage either of said balls, while in said on mode, said rod will be shifted within said passage by contact of one rod end with one of said balls, thereby bringing the side of said other rod end against said other ball to automatically create a positive driving connection between said powered member and said shaft.

2. A self aligning clutch for selectively transferring torque in a vehicle seat adjuster mechanism, comprising, a generally cylindrical shaft supported on said vehicle so as to spin about its axis, said shaft including a passage therethrough normal to said axis that slidably supports a rod therein with an end to end length greater than the length of said passage, a powered member having a cylindrical wall that is supported on said vehicle so as to be driven about its axis coaxial to said shaft and in surrounding relation to the ends of said rod, said cylindrical wall further having spaced holes on its circumference for supporting a pair of balls therein for radial movement in and out of said holes and having an angular offset corresponding to the width of said rod, a generally cylindrical control member located in surrounding relation to said balls and axially movable from a disengaged to an engaged position, said control member having a stepped inner diameter so as to confine said balls at a radial position spaced apart farther than the length of said rod when in said disengaged position while confining said balls at a radial position spaced apart less than the length of said rod when in said engaged position, and, means selectively operable to move said control member from said disengaged to said engaged position, whereby said control member, in said disengaged position, will allow said balls to be moved radially out by their contact with the ends of said rod, which contact will self center said rod within its passage so that it does not positively engage either of said balls, while in said engaged position, said rod will be shifted within said passage by contact of one rod end with one of said balls, thereby bringing the side of said other rod end against said other ball to automatically create a positive driving connection between said powered member and said shaft.

3. A self aligning clutch for selectively transferring torque in a vehicle seat adjuster mechanism, comprising, a generally cylindrical shaft supported on said vehicle so as to spin about its axis, said shaft including a passage therethrough normal to said axis that slidably supports a rod therein with an end to end length greater than the length of said passage, a powered member having a cylindrical wall that is supported on said vehicle so as to be driven about its axis coaxial to said shaft and in surrounding relation to the ends of said rod, said cylindrical wall further having spaced holes on its circumference for supporting a pair of balls therein for radial movement in and out of said holes, and having an angular offset corresponding to the width of said rod, a generally cylindrical control member located in surrounding relation to said balls and slidably movable on said shaft from a disengaged to an engaged position, said control member having a stepped inner diameter so as to confine said balls at a radial position spaced apart farther than the length of said rod when in said disengaged position while confining said balls at a radial position spaced apart less than the length of said rod when in said engaged position, and, a solenoid selectively operable to shift said control member on said shaft from said disengaged to said engaged position, whereby said control member, in said disengaged position, will allow said balls to be moved radially out by their contact with the ends of said rod, which contact will self center said rod within its passage so that it does not positively engage either of said balls, while in said engaged position, said rod will be shifted within said passage by contact of one rod end with one of said balls, thereby bringing the side of said other rod end against said other ball to automatically create a positive driving connection between said powered member and said shaft.

* * * * *